United States Patent
Kuribayashi et al.

(10) Patent No.: US 6,810,000 B2
(45) Date of Patent: Oct. 26, 2004

(54) CLOCK GENERATOR HAVING A CROSSTALK REMOVING CIRCUIT FOR USE IN A RECORDING INFORMATION REPRODUCTION APPARATUS

(75) Inventors: Hiroki Kuribayashi, Saitama (JP); Shogo Miyanabe, Saitama (JP)

(73) Assignee: Pioneer Electronic Corporation, Tokyo (JP)

( * ) Notice: Subject to any disclaimer, the term of this patent is extended or adjusted under 35 U.S.C. 154(b) by 799 days.

(21) Appl. No.: 09/158,925

(22) Filed: Sep. 23, 1998

(65) Prior Publication Data
US 2001/0043526 A1 Nov. 22, 2001

(30) Foreign Application Priority Data
Sep. 24, 1997 (JP) .............................................. 9-258088

(51) Int. Cl.[7] ................................................. G11B 7/00
(52) U.S. Cl. ............................. 369/59.16; 369/59.21; 369/59.22
(58) Field of Search ................................. 369/59, 47.17

(56) References Cited

U.S. PATENT DOCUMENTS

| | | | | |
|---|---|---|---|---|
| 5,280,466 A | * | 1/1994 | Tomita ..................... | 369/275.1 |
| 5,455,813 A | * | 10/1995 | Hayashi ....................... | 369/59 |
| 5,606,540 A | * | 2/1997 | Hayashi ....................... | 369/59 |
| 5,657,312 A | * | 8/1997 | Hayashi .................... | 369/275.3 |
| 5,663,945 A | * | 9/1997 | Hayashi et al. ........... | 369/59 X |
| 5,835,467 A | * | 11/1998 | Tomita et al. ................ | 369/59 |

FOREIGN PATENT DOCUMENTS

| | | | |
|---|---|---|---|
| EP | 559493 A2 | * | 8/1993 |
| JP | 3-156729 | * | 7/1991 |
| JP | 3-178040 | * | 8/1991 |
| JP | 9-320200 | * | 12/1997 |

OTHER PUBLICATIONS

English translation, JP 3–178040.*

* cited by examiner

Primary Examiner—Aristotelis M. Psitos
(74) Attorney, Agent, or Firm—Morgan, Lewis & Bockius, LLP

(57) ABSTRACT

A clock generator in a recorded information reproduction apparatus for reproducing recorded information from a recording medium includes a pickup that produces a reading signal by reading a recording track of the recording medium. The reading signal is sampled by a sampling circuit at timing corresponding to a clock signal to produce a reading sample value sequence. A crosstalk removing circuit removes crosstalk components which are present in recording tracks adjacent to the recording track read by the pickup from the reading sample value sequence and produces a crosstalk-removed reading sample value sequence. A phase detecting circuit detects a phase error existing in the reading signal based on the crosstalk-removed reading sample value sequence. A clock signal generating circuit generates the clock signal based on the phase error.

14 Claims, 6 Drawing Sheets

CLOCK GENERATOR HAVING A CROSSTALK REMOVING CIRCUIT FOR USE IN A RECORDING INFORMATION REPRODUCTION APPARATUS

This application claims the benefit of Japanese Patent Application No. 9-258088, filed Sep. 24, 1997, which is hereby incorporated by reference.

BACKGROUND OF THE INVENTION

1. Field of the Invention

This invention relates to a recorded information reproduction apparatus and, more particularly, to a clock generator for generating a clock signal synchronized in phase with recorded information according to a reading signal read from a recording medium.

2. Description of the Related Art

FIG. 1 is a diagram showing structure of a recorded information reproduction apparatus.

Referring to FIG. 1, a pickup 1 reads recorded information from a recording disk 3 driven by a spindle motor 2 and a reading signal obtained at this time is supplied to a head amplifier 4. The head amplifier 4 supplies a reading signal amplified at a desired level to an A/D converter 5. The A/D converter 5 samples this amplified reading signal at a timing of a clock signal successively supplied from a PLL circuit 10 and supplies a reading sample value sequence to each of the PLL, circuit 10 and a Viterbi decoder 30.

A phase detecting circuit 11 of the PLL circuit 10 detects a phase error existing in the aforementioned reading signal based on a reading sample value sequence supplied successively from the A/D converter 5 and supplies a phase error signal corresponding to this phase error to an LPF (low-pass filter) 12. The LPF 12 supplies an average phase error signal obtained by averaging the phase error signal to the VCO (voltage control oscillator) 13. The VCO 13 generates a clock signal having a frequency corresponding to this average phase error signal and supplies this signal to the A/D converter 5. The Viterbi decoder 30 obtains the most certain binary reproduced data possible based on the reading sample value sequence supplied successively from the A/D converter 5.

However, if a reading signal obtained by reading by the aforementioned pickup 1 is under an influence of crosstalk, proper phase error detection is disabled in the phase detecting circuit 11 of the PLL circuit 10 so that jitter occurs in the generated clock signal.

SUMMARY OF THE INVENTION

Accordingly, the present invention is directed to a clock generator that substantially obviates one or more of the problems due to limitations and disadvantages of the related art. An object of the present invention is to provide a clock generator capable of generating a clock signal synchronized properly in phase with recorded information based on a reading signal even in the situation where the reading signal is affected by crosstalk.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention, as embodied and broadly described, the present invention provides a clock generator in a recorded information reproduction apparatus for reproducing recorded information from a recording medium, including a pickup for producing a reading signal by reading a recording track of the recording medium, a sampling circuit for sampling the reading signal at a timing corresponding to a clock signal and producing a reading sample value sequence, a crosstalk removing circuit for removing crosstalk components from the reading sample value sequence and producing a crosstalk-removed reading sample value sequence, the crosstalk components being present in recording tracks adjacent to the recording track read by the pickup, a phase detecting circuit for detecting a phase error existing in the reading signal based on the crosstalk-removed reading sample value sequence, and a clock signal generating circuit for generating the clock signal based on the phase error.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention In the drawings.

DETAILED DESCRIPTION OF THE PREFERRED EMBODIMENTS

Reference will now be made in detail to the preferred embodiments of the invention, examples of which are illustrated in the accompanying drawings.

Figure 1:
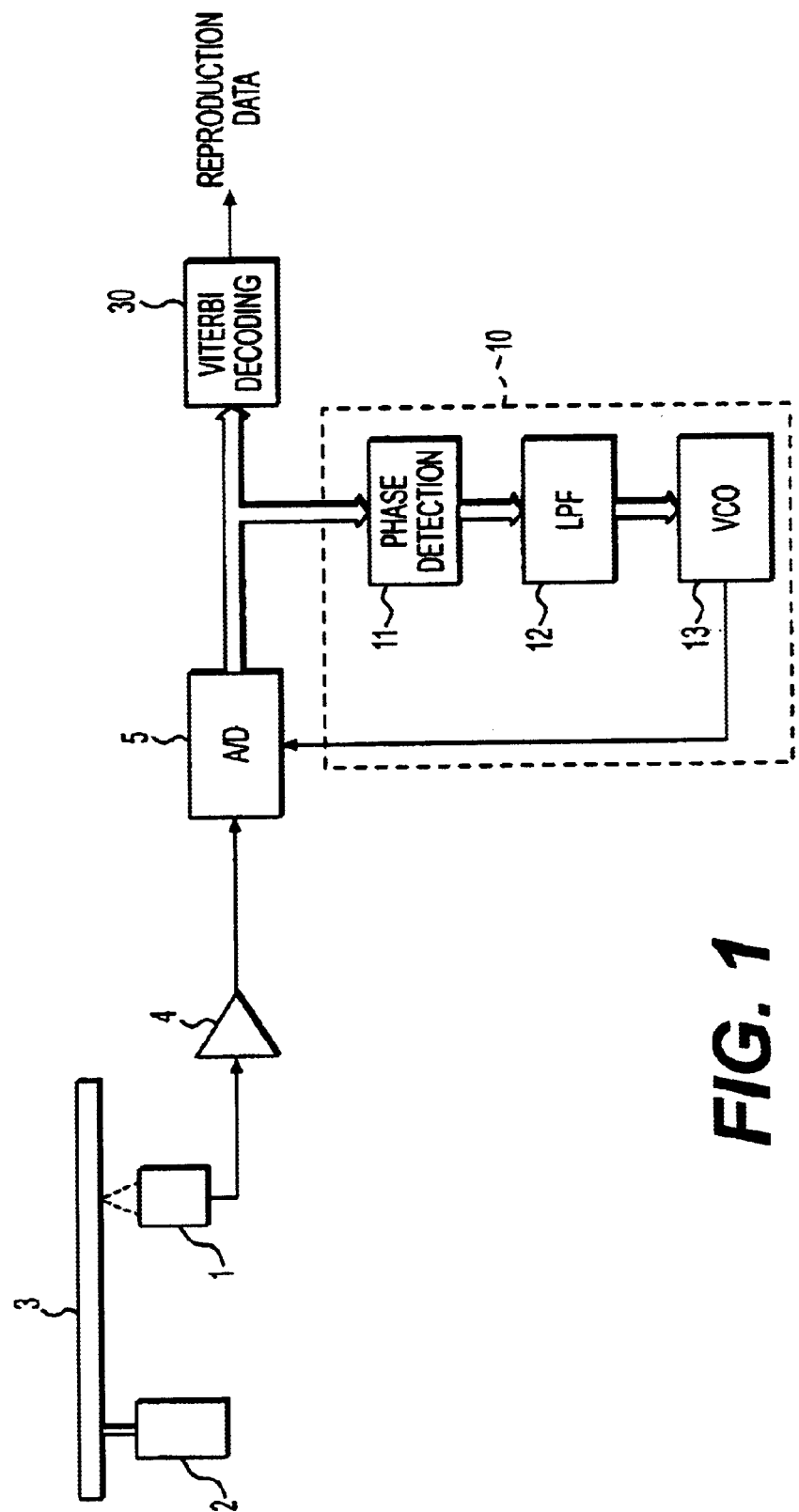
FIG. 1 is a diagram showing an example of a structure of a conventional recorded information reproduction apparatus.
Figure 2:
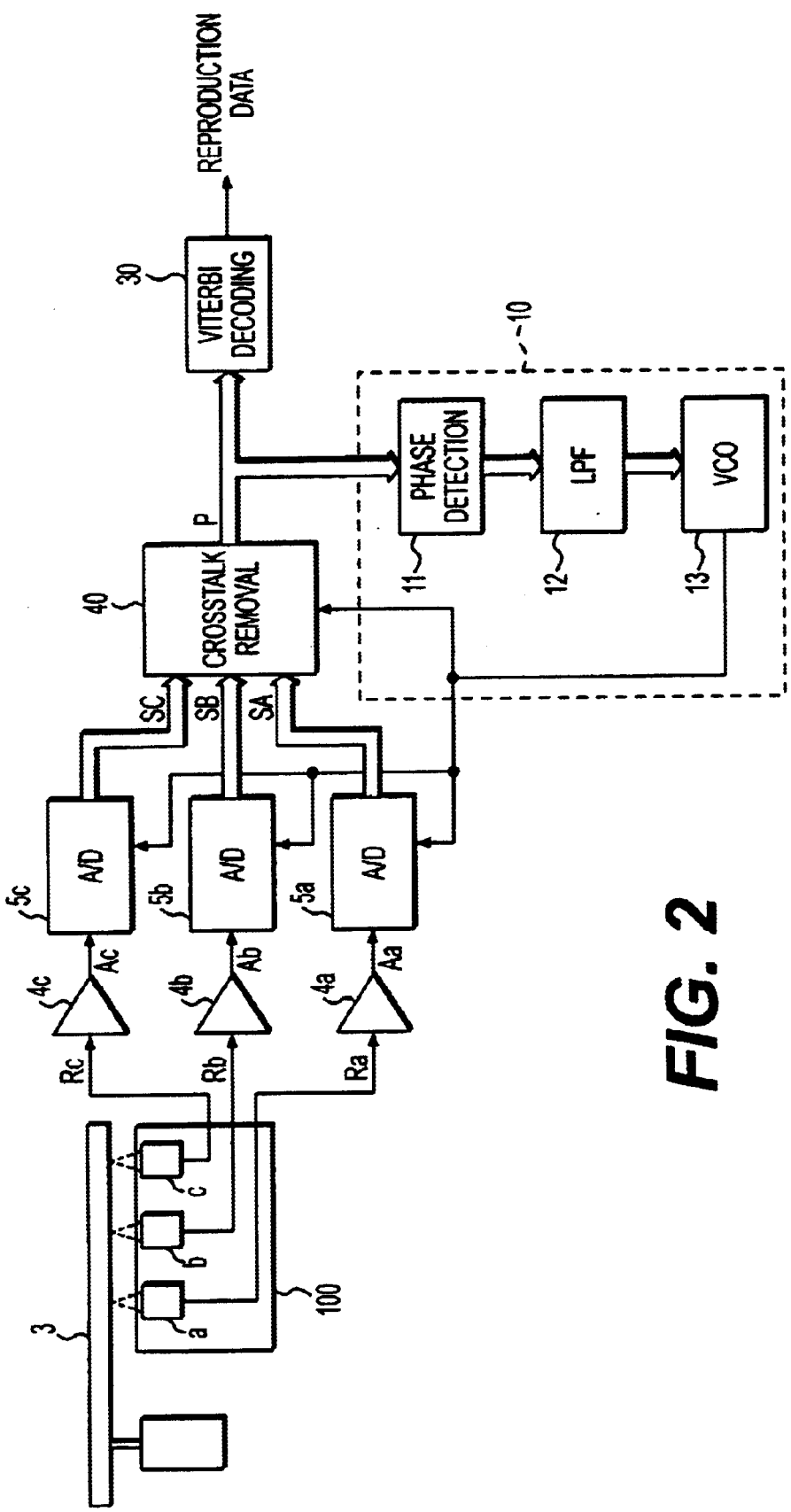
FIG. 2 is a diagram showing a structure of a recorded information reproduction apparatus having a clock generator according to the present invention.

FIG. 2 is a diagram showing a structure of a recorded information reproduction apparatus provided with a clock generator in accordance with the present invention. Referring to FIG. 2, a pickup 100 contains three reading means (e.g., pickups) a to c. The reading means a to c supply reading signals Ra to Rc to the head amplifiers 4a to 4c at the same time. Reading signals Ra to Rc are obtained by reading recorded information from three recording tracks which are adjacent to each other and formed on a recording disk 3.

Figure 3:
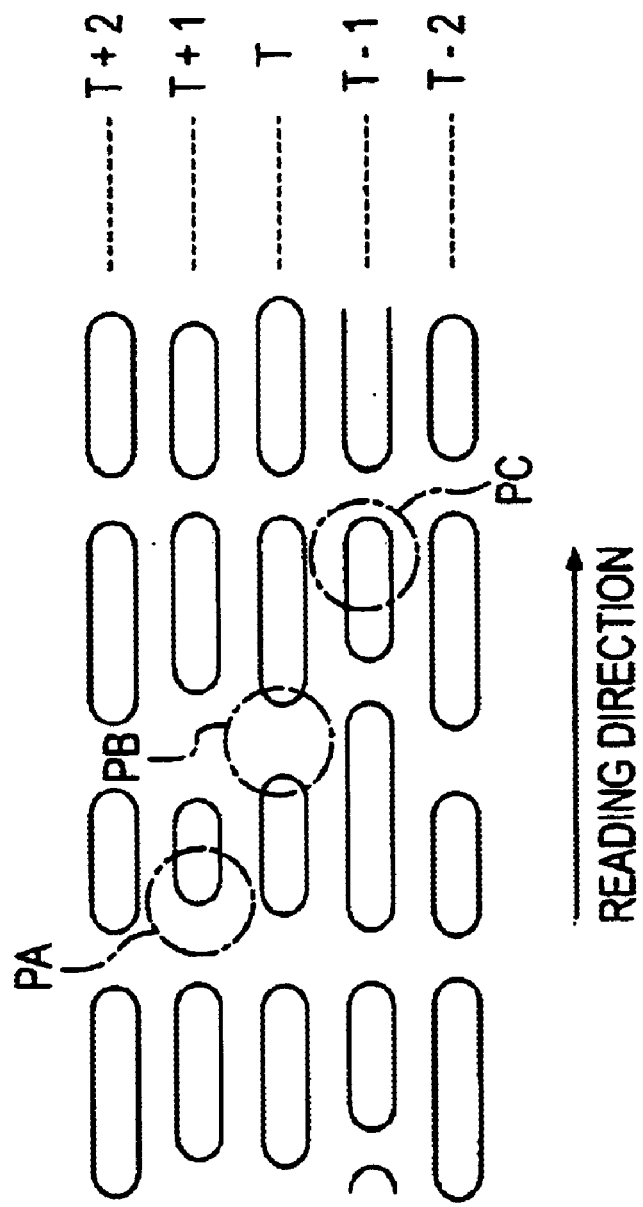
FIG. 3 is a diagram showing a relation between beam spots PA–PC which are irradiated from respective reading means a–c, and respective recording tracks, on the recording disc 3.

As shown in FIG. 3, for example, when the reading means b is reading recorded information from a recording track T by irradiating beam spot PB on the recording track T, the reading means a reads recorded information from the recording track (T+1) by irradiating beam spot PA on a recording track (T+1) which is adjacent to the recording track T. Further, the reading means c reads recorded information from the recording track (T−1) by irradiating beam spot PC on the recording track (T−1) which is adjacent to the recording track T.

The head amplifiers 4a to 4c (FIG. 2) amplify reading signals Ra to Rc supplied from the reading means a to c at a desired level and supply the amplified reading signals to the A/D converters 5a to 5c.

The A/D converters 5a to 5c sample the amplified reading signals Aa to Ac successively at a timing of a clock signal supplied from the PLL circuit 10 and supply the reading sample value sequence SA to SC to a crosstalk removing circuit 40.

Figure 4:
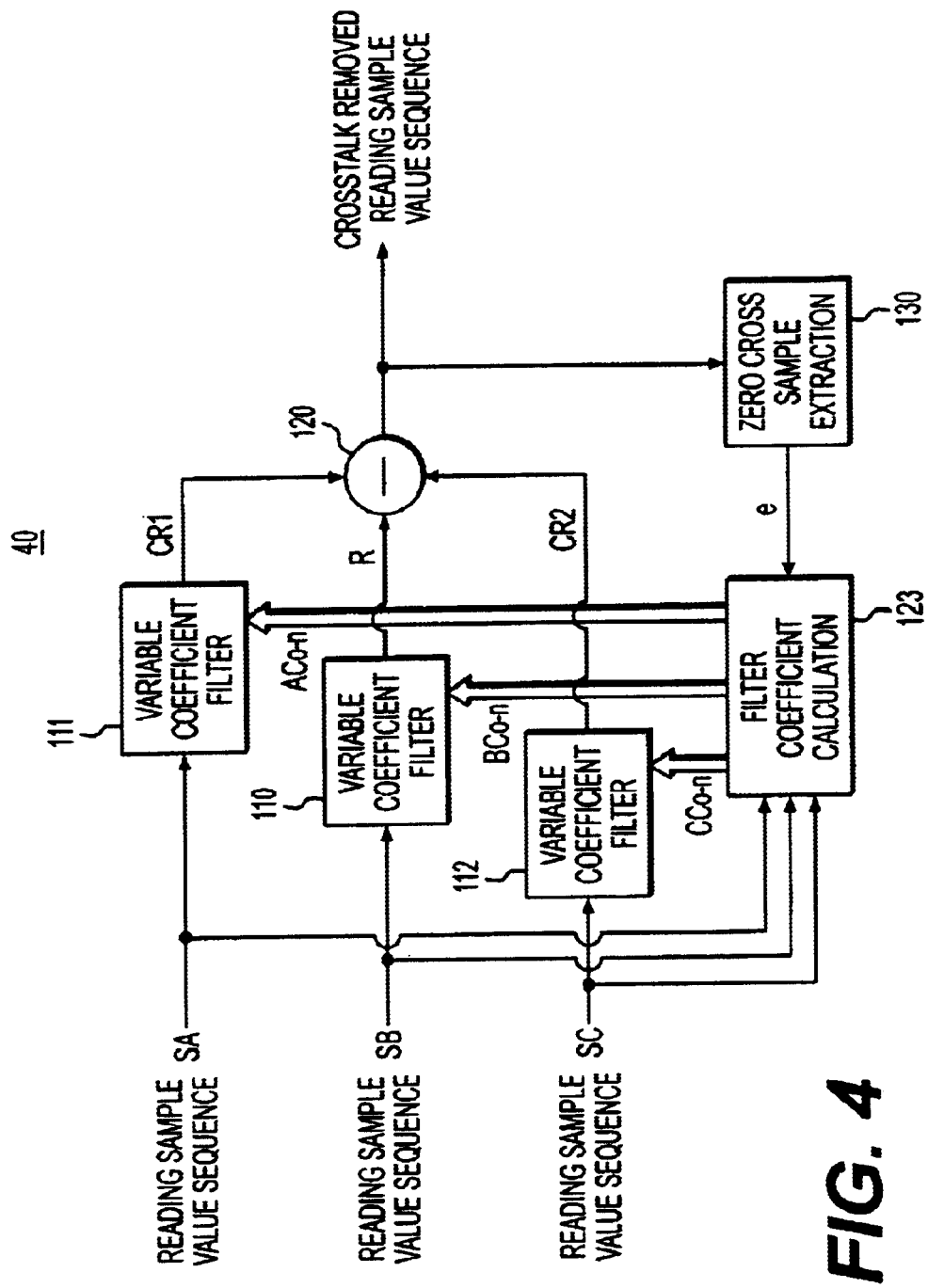
FIG. 4 is a diagram showing an example of an internal structure of a crosstalk removing circuit 40.

FIG. 4 is a diagram showing an example of an internal structure of the crosstalk removing circuit 40.

As shown in FIG. 4, the crosstalk removing circuit 40 comprises three variable coefficient filters 110–112, a subtractor 120, a zero cross sample value extraction circuit 130 and a filter coefficient calculation circuit 123.

Figure 5:
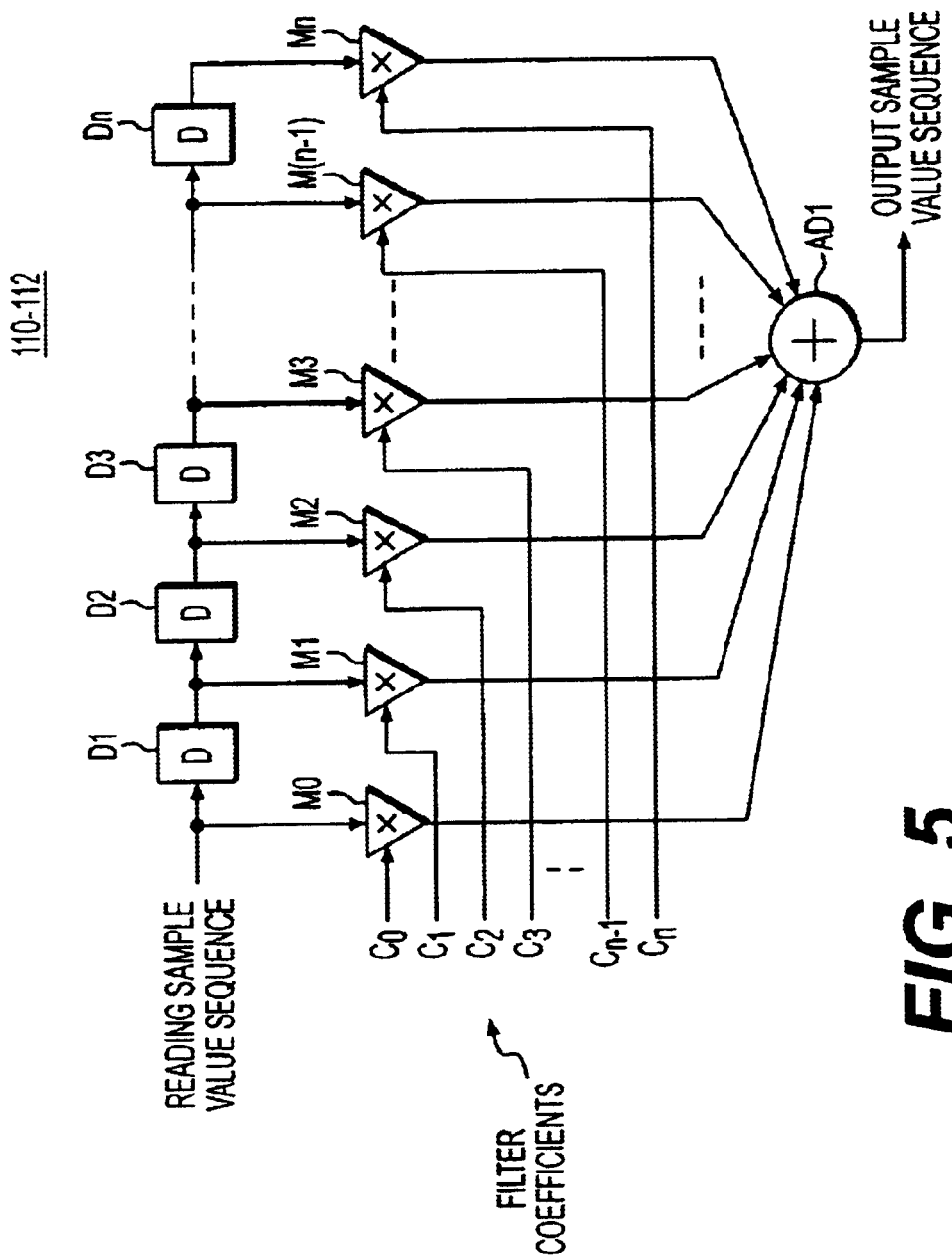
FIG. 5 is a diagram showing an internal structure of variable coefficient filters 110–112.

Each of the variable coefficient filters 110–112 is a transversal filter, such as shown in FIG. 5.

The transversal filter of FIG. 5 comprises n stage D flip-flops D1 to Dn connected in series for shifting the reading sample value sequence (SA, SB, SC) successively and retrieving or fetching it, a coefficient multiplier M0 for multiplying the reading sample value sequence by a filter coefficient $C_0$, coefficient multipliers M1–Mn for multiplying each output of the D flip-flops D1 to Dn by a filter coefficient $C_1$–$C_n$, and an adder AD1 for outputting a sum of the products of the coefficient multipliers M0–Mn.

Figure 6:
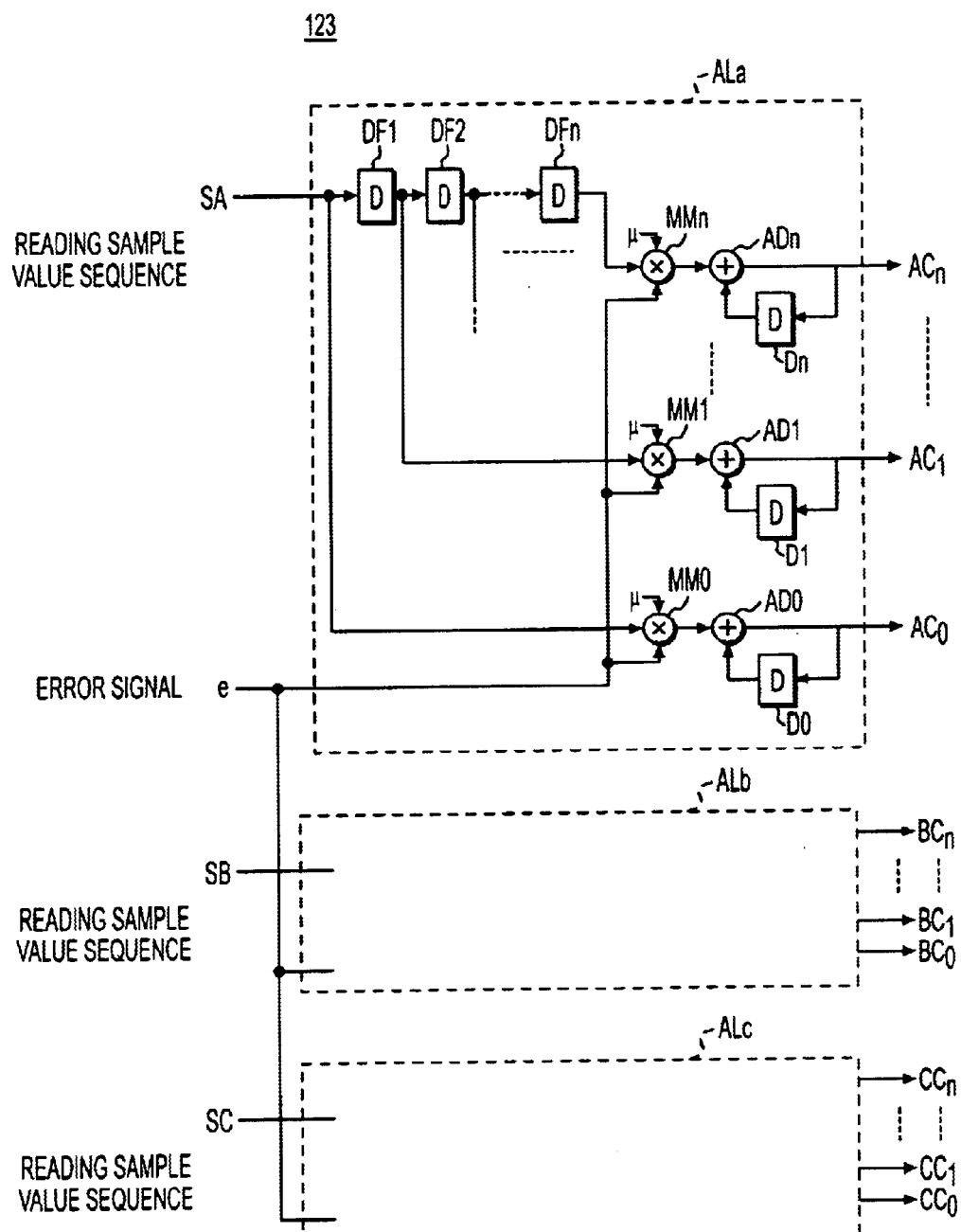
FIG. 6 is a diagram showing an internal structure of a filter coefficient operating circuit 123.

The variable coefficient filter 110, having such a structure, filters the reading sample value sequence SB with filter coefficients $BC_0$–$BC_n$ supplied from the filter coefficient operating circuit 123 shown, for example, in FIG. 6. Consequently, the variable coefficient filter 110 obtains a reading sample value sequence R (FIG. 4) in which an interference between symbols is removed and then supplies it to the subtractor 120. The variable coefficient filter 11 filters the reading sample value sequence SA with the filter coefficients $AC_0$–$AC_n$. Consequently, the variable coefficient filter 111 obtains or generates a crosstalk sample value sequence CR1 corresponding to a crosstalk component from an adjacent track (track T+1 in FIG. 3) and then supplies it to the subtractor 120. Similarly, the variable coefficient filter 112 filters the reading sample value sequence SC with the filter coefficients $CC_0$–$CC_n$, obtains a crosstalk sample value sequence CR2 corresponding to a crosstalk component from an adjacent track (track T−1 in FIG. 3) and then supplies it to the subtractor 120.

The subtracter 120 subtracts the crosstalk sample value sequences CR1 and CR2 from the reading sample value sequence R respectively so as to obtain a crosstalk-removed reading sample value sequence P. Then, this value is supplied to the PLL circuit 10 and the Viterbi decoder 30 as shown in FIG. 2.

If the sample value changes from positive to negative or from negative to positive in three continuous sample value sequences of the aforementioned crosstalk-removed reading sample value sequence P successively supplied from the subtractor 120, a median sample value of these three values, that is, a value at a zero crossing point, is extracted and supplied to the filter coefficient calculation circuit 123 as an error signal e.

The filter coefficient calculation circuit 123 obtains filter coefficients $AC_0$–$AC_n$ according to the reading sample value sequence SA and error signal e and supplies these coefficients to the variable coefficient filter 111 as filter coefficients $C_0 14\ C_n$ of the variable coefficient filter 111. The filter coefficient calculation circuit 123 obtains filter coefficients $BC_0 14\ BC_n$ according to the reading sample value sequence SB and error signal e and supplies these values to the variable coefficient filter 110 as filter coefficients $C_0 14\ C_n$ of the variable coefficient filter 110. Further, the filter coefficient calculation circuit 123 obtains filter coefficients $CC_0 14\ CC_n$ according to the reading sample value sequence SC and error signal e and supplies these coefficients to the variable coefficient filter 112 as filter coefficients $C_0 14\ C_n$ of the variable coefficient filter 112.

The filter coefficient calculation circuit 123 updates the filter coefficients $AC_0 14\ AC_n$, $BC_0 14\ BC_n$, $CC_0 14\ CC_n$ so that the error signal e converges to 0 based on LMS (least mean square) adaptive algorithm.

FIG. 6 is a diagram showing an internal structure of the filter coefficient calculation circuit 123.

Referring to FIG. 6, the coefficient calculation circuit ALa outputs filter coefficients $AC_0 14\ AC_n$ based on the reading sample value sequence SA and error signal e. The coefficient calculation circuit ALb outputs filter coefficients $BC_0 14\ BC_n$ based on the reading sample value sequence SB and error signal e. The coefficient calculation circuit ALc outputs filter coefficients $CC_0 14\ CC_n$ based on the reading sample value sequence SC and error signal e. The coefficient calculation circuits ALa, ALb and ALc have the same structure.

For example, as shown in FIG. 6, the coefficient calculation circuit ALa comprises n-stage D flip-flops DF1–DFn connected in series which successively shift the reading sample value sequence SA and fetch or retrieve it, multipliers MM1–MMn, adders AD0–ADn, and D flip-flops D0–Dn. Here, the multiplier MM0 supplies the reading sample value sequence SA and error signal e each multiplied by a correction coefficient $\mu$ to an accumulator comprising the adder AD0 and D flip-flop D0. The accumulator successively accumulates multiplication results of the multiplier MM0 and outputs the accumulation result as a filter coefficient $AC_0$. The multiplier MM1 multiplies the reading sample value sequence SA, which is supplied with delay of 1 sampling timing by the D flip-flop DF1, by the error signal e and correction coefficient $\mu$. The accumulator comprising the adder AD1 and D flip-flop D1 accumulates multiplication results of the multiplier MM1 and outputs the accumulation result as a filter coefficient $AC_1$. Likewise, the multiplication results of the multipliers MM2–MMn are accumulated by each accumulator and those values are outputted as filter coefficients $AC_2 14\ AC_n$.

The aforementioned correction coefficient $\mu$ is a coefficient for adjusting the convergence of the LMS adaptive algorithm For example, if the correction coefficient $\mu$ is increased, the convergence speed of making the error signal e to be 0 can be increased, but there occurs a possibility of divergence. On the other hand, if the correction coefficient $\mu$ is decreased, the convergence speed is decreased although the convergence is ensured With such a structure, the crosstalk removing circuit 40 removes an interference between symbols from the reading signal obtained from the track T shown in FIG. 3, for example, by adaptive signal processing using the LMS adaptive algorithm so as to obtain the reading sample value sequence R. Further, by such adaptive signal processing, crosstalk sample value sequence CR1 and CR2 corresponding to the crosstalk components are obtained based on the reading signal obtained from each of both the tracks (T+1, T-1) adjacent to the track T. Here, by subtracting the crosstalk sample value sequences CR1 and CR2 corresponding to the crosstalk component from the adjacent tracks from the reading sample value sequence R, the crosstalk removed reading sample value sequence P, in which an influence of the crosstalk from the adjacent track is excluded, is obtained.

The phase detecting circuit 11 of the PLL circuit 10 detects a phase error existing in the reading signal based on the crosstalk-removed reading sample value sequence P and supplies a phase error signal corresponding to this phase error to the LPF (low pass filter) 12. The LPF 12 supplies the VCO (voltage control oscillator) with an average phase error signal obtained by averaging the phase error signals. The VCO 13 generates a clock signal having an oscillation frequency corresponding to this average phase error signal and supplies this to the A/D converters 5a–5c and crosstalk removing circuit 40.

The Viterbi decoder 30 obtains a possible most certain binary reproduction data based on the crosstalk removed sample value sequence P.

As described above, in the clock generator of the present invention, the crosstalk component existing in the reading signal obtained from a recording medium is removed, the reading sample value sequence from which the crosstalk component is removed is subjected to detection for the phase error, and a signal having the oscillation frequency corresponding to the phase error is generated as the clock signal.

Therefore, even if the reading signal obtained from the recording medium is affected by the crosstalk from the adjacent track, an accurate clock signal synchronized with recorded information in phase can be generated based on the reading signal.

Although in the aforementioned crosstalk removing circuit 40, the crosstalk is removed by using the reading signal obtained from three recording tracks at the same time by three reading means a to c, the present invention is not restricted to such a structure. That is, any structure is permissible as long as the crosstalk can be removed from the recording track existing on both adjacent sides of a recording track of a reading object.

It will be apparent to those skilled in the art that various modifications and variations can be made in the clock generator of the present invention without departing from the spirit or scope of the invention. Thus, it is intended that the present invention cover the modifications and variations of this invention provided they come within the scope of the appended claims and their equivalents.

What is claimed is:

1. A clock generator in a recorded information reproduction apparatus for reproducing recorded information from a recording medium, comprising:
   a pickup which produces a reading signal by reading a recording track of the recording medium;
   a sampling circuit which samples the reading signal at a timing corresponding to a clock signal and produces a reading sample value sequence;
   a crosstalk removing circuit which removes crosstalk components from the reading sample value sequence and produces a crosstalk removed reading sample value sequence, the crosstalk components being present in recording tracks adjacent to the recording track read by the pickup;
   a phase detecting circuit which detects a phase error existing in the reading signal based on the crosstalk-removed reading sample value sequence; and
   a clock signal generating circuit which generates the clock signal based on the phase error.

2. A clock generator according to claim 1, wherein the crosstalk removing circuit comprises:
   a plurality of filters which obtain the crosstalk components according to reading signals read from the recording tracks adjacent to the recording track read by the pickup; and
   a subtractor which obtains the crosstalk removed reading sample value sequence by subtracting the crosstalk components from the reading sample value sequence.

3. A clock generator according to claim 1, wherein the pickup reads a plurality of recording tracks of the recording medium at the same time.

4. A clock generator in a recorded information reproduction apparatus for reproducing recorded information from a recording medium, comprising:
   a pickup which produces a reading signal by reading information from a recording track of the recording medium;
   a sampling circuit which samples the reading signal at a timing corresponding to a clock signal and produces a reading sample value sequence;
   a crosstalk removing circuit which removes crosstalk components from the reading sample value sequence and produces a crosstalk-removed reading sample value sequence, the crosstalk components being present in recording tracks adjacent to the recording track read by the pickup;
   a phase detecting circuit which detects a phase error existing in the reading signal based on the crosstalk-removed reading sample value sequence; and
   a clock signal generating circuit which generates the clock signal, the clock signal having an oscillation frequency corresponding to the phase error detected by the phase detecting circuit.

5. A clock generator according to claim 4, wherein the crosstalk components according to reading signals read from the recording tracks adjacent to the recording track read by the pickup; and
   a subtractor which obtains the crosstalk-removed reading sample value sequence by subtracting the crosstalk components from the reading sample value sequence.

6. A clock generator according to claim 4, wherein the pickup reads a plurality of recording tracks of the recording medium at the same time.

7. A clock generator in a recorded information reproduction apparatus for reproducing recorded information from a recording medium, the clock generator comprising:
   pickup means for producing a reading signal by reading a recording track of the recording medium;
   sampling means for sampling the reading signal at a timing corresponding to a clock signal and producing a reading sample value sequence;
   crosstalk removing means for removing crosstalk components from the reading sample value sequence and producing a crosstalk-removed reading sample value sequence, the crosstalk components being present in recording tracks adjacent to the recording track read by the pickup means;
   phase detecting means for detecting a phase error existing in the reading signal based on the crosstalk-removed reading sample value sequence; and
   clock signal generating means for generating the clock signal based on the phase error.

8. The clock generator according to claim 7, wherein the crosstalk removing means comprises:
- a plurality of filter means for obtaining the crosstalk components according to reading signals read from the recording tracks adjacent to the recording track read by the pickup means; and
- substractor means for obtaining the crosstalk-removed reading sample value sequence by subtracting the crosstalk components from the reading sample value sequence.

9. The clock generator according to claim 7, wherein the pickup means reads a plurality of recording tracks of the recording medium at the same time.

10. A clock generator in a recorded information reproduction apparatus for reproducing recorded information from a recording medium, the clock generator comprising:
- pickup means for producing a reading signal by reading information from a recording track of the recording medium;
- sampling means for sampling the reading signal at a timing corresponding to a clock signal and producing a reading sample value sequence;
- crosstalk removing means for removing crosstalk components from the reading sample value sequence and producing a crosstalk-removed reading sample value sequence, the crosstalk components being present in recording tracks adjacent to the recording track read by the pickup means;
- phase detection means for detecting a phase error existing in the reading signal based on the crosstalk-removed reading sample value sequence; and
- clock signal generating means for generating the clock signal, the clock signal having an oscillation frequency corresponding to the phase error detected by the phase circuit.

11. The clock generator according to claim 10, wherein the crosstalk removing circuit means comprises:
- a plurality of filter means for obtaining the crosstalk components according to reading signals read from the recording tracks adjacent to the recording track being read by the pickup means; and
- subtractor means for obtaining the crosstalk-removed reading sample value sequence by subtracting the crosstalk components from the reading sample value sequence.

12. The clock generator according to claim 10, wherein the pickup means reads a plurality of recording tracks of the recording medium at the same time.

13. A clock generator in a recorded information reproduction apparatus for reproducing recorded information from a recording medium, comprising:
- a pickup which produces a reading signal by reading a recording track of the recording medium;
- a sampling circuit which samples the reading signal at a timing corresponding to a clock signal and produces a reading sample value sequence;
- a crosstalk removing circuit which removes crosstalk components from the reading sample value sequence and produces a crosstalk-removed reading sample value sequence, the crosstalk components being present in recording tracks adjacent to the recording track read by the pickup;
- a phase detecting circuit which detects a phase error existing in the crosstalk-removed reading sample value sequence; and
- a clock signal generating circuit which generates the clock signal based on the detected phase error of the crosstalk-removed reading sample value sequence.

14. A clock generator in a recorded information reproduction apparatus for reproducing recorded information from a recording medium, comprising:
- a pickup having an output, wherein the pickup reads a recording track of the recording medium and produces a reading signal at the output of the pickup;
- a sampling circuit having an input and an output, the input being coupled to the output of the pickup and receiving the reading signal, wherein the sampling circuit samples the reading signal at a timing corresponding to a clock signal and produces a reading sample value sequence at the output of the sampling circuit;
- a crosstalk removing circuit having an input and an output, the input being coupled to the output of the sampling circuit and receiving the reading sample value sequence, wherein the crosstalk removing circuit removes crosstalk components from the reading sample value sequence and produces a crosstalk-removed reading sample value sequence at the output of the crosstalk removing circuit, the crosstalk components being present in recording tracks adjacent to the recording track read by the pickup;
- a phase detecting circuit having an input and an output, the input being coupled to the output of the crosstalk removing circuit and receiving the crosstalk-removed reading sample value sequence, wherein the phase detecting circuit detects a phase error existing in the crosstalk-removed reading sample value sequence and produces a detected phase error at the output of the phase detecting circuit; and
- a clock signal generating circuit having an input coupled to the output of the phase detecting circuit, wherein the clock signal generating circuit generates the clock signal based on the detected phase error received from the output of the phase detecting circuit.

* * * * *